US009787591B2

(12) United States Patent
Bello et al.

(10) Patent No.: US 9,787,591 B2
(45) Date of Patent: *Oct. 10, 2017

(54) AUTONOMIC INGRESS TRAFFIC LOAD BALANCING IN LINK AGGREGATION GROUPS BY MODIFICATION OF SWITCH ROUTING

(71) Applicant: International Business Machines Corporation, Armonk, NY (US)

(72) Inventors: Adekunle Bello, Pflugerville, TX (US); Omar Cardona, Cedar Park, TX (US); Shaival J. Chokshi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,088

(22) Filed: Feb. 1, 2016

(65) Prior Publication Data
US 2016/0149821 A1    May 26, 2016

Related U.S. Application Data

(63) Continuation of application No. 14/095,319, filed on Dec. 3, 2013, now Pat. No. 9,325,622.

(51) Int. Cl.
*H04L 12/26* (2006.01)
*H04L 12/803* (2013.01)
(Continued)

(52) U.S. Cl.
CPC ........ *H04L 47/125* (2013.01); *H04L 43/0882* (2013.01); *H04L 45/02* (2013.01);
(Continued)

(58) Field of Classification Search
None
See application file for complete search history.

(56) References Cited

U.S. PATENT DOCUMENTS 7,864,818 B2  1/2011  Fong et al.
7,940,661 B2  5/2011  Ervin et al.
(Continued)

FOREIGN PATENT DOCUMENTS

CN    102045253 A    5/2011
CN    102118319 A    7/2011
(Continued)

OTHER PUBLICATIONS

U.S. Appl. No. 14/095,319.
U.S. Appl. No. 14/304,218.
U.S. Appl. No. 15/012,267.

*Primary Examiner* — Kwang B Yao
*Assistant Examiner* — Juvena Loo
(74) *Attorney, Agent, or Firm* — Stephen J. Walder, Jr.; Thomas E. Tyson

(57) ABSTRACT

Mechanisms are provided for performing traffic load balancing on ingress traffic directed to a Link Aggregation Group (LAG). The mechanisms monitor a ingress traffic load across a plurality of links of the Link Aggregation Group (LAG). The mechanisms determine if the ingress traffic load across the plurality of links is unbalanced. Moreover, the mechanisms, in response to determining that the ingress traffic load across the plurality of links is unbalanced, send a message to a switch associated with the LAG requesting the switch to modify routing of ingress traffic to the LAG to perform ingress traffic load balancing.

20 Claims, 5 Drawing Sheets

(51) Int. Cl.
*H04L 12/891* (2013.01)
*H04L 12/721* (2013.01)
*H04L 12/707* (2013.01)
*H04L 12/751* (2013.01)
*H04L 12/709* (2013.01)

(52) U.S. Cl.
CPC ............ *H04L 45/22* (2013.01); *H04L 45/245* (2013.01); *H04L 45/38* (2013.01); *H04L 45/70* (2013.01); *H04L 47/41* (2013.01); *H04L 45/24* (2013.01); *Y02B 60/33* (2013.01)

(56) References Cited

U.S. PATENT DOCUMENTS

| | | | |
|---|---|---|---|
| 8,284,791 B2 | 10/2012 | Unger et al. | |
| 8,937,865 B1* | 1/2015 | Kumar | H04L 47/125 370/235 |
| 2006/0251106 A1 | 11/2006 | Nakagawa et al. | |
| 2007/0064605 A1 | 3/2007 | Ho et al. | |
| 2008/0291826 A1* | 11/2008 | Licardie | H04L 47/10 370/230 |
| 2008/0298236 A1* | 12/2008 | Ervin | H04L 47/10 370/232 |
| 2010/0165831 A1 | 7/2010 | Elie-Dit-Cosaque et al. | |
| 2012/0087372 A1 | 4/2012 | Narasimhan | |
| 2012/0102217 A1* | 4/2012 | Cardona | G06F 9/45558 709/235 |
| 2012/0320914 A1 | 12/2012 | Thyni et al. | |
| 2013/0003549 A1 | 1/2013 | Matthews et al. | |
| 2013/0003559 A1 | 1/2013 | Matthews | |
| 2014/0119193 A1 | 5/2014 | Anand et al. | |
| 2015/0156119 A1 | 6/2015 | Bello et al. | |
| 2015/0156127 A1 | 6/2015 | Bello et al. | |

FOREIGN PATENT DOCUMENTS

| | | |
|---|---|---|
| CN | 102347876 A | 2/2012 |
| CN | 102447638 A | 5/2012 |

* cited by examiner

AUTONOMIC INGRESS TRAFFIC LOAD BALANCING IN LINK AGGREGATION GROUPS BY MODIFICATION OF SWITCH ROUTING

This application is a continuation of application Ser. No. 14/095,319, filed Dec. 3, 2013, status pending.

BACKGROUND

The present application relates generally to an improved data processing apparatus and method and more specifically to mechanisms for autonomic traffic load balancing in link aggregation groups.

A physical network is typically abstracted at the endpoints for availability and scalability purposes. Both availability and scalability are addressed by providing Link Aggregation Groups (LAGs). Link aggregation is a computer networking term used to describe various methods of combining, or aggregating, multiple network connections in parallel to increase throughput beyond what a single connection could sustain, and to provide redundancy in case one of the links fails. Such link aggregation may be implemented at any of the lowest three levels of the Open Systems Interconnection (OSI) model. Examples of aggregation at layer 1 (physical layer) are power line and wireless network devices that combine multiple frequency bands. OSI layer 2 (data link layer) aggregation typically occurs across switch ports, which can be either physical ports or virtual ports managed by an operating system. OSI layer 3 (network layer) aggregation is possible using round-robin scheduling, or hash value based scheduling, a combination, or the like.

The combining of links can either occur such that multiple interfaces share one logical address (e.g., IP address) or one physical address (e.g., MAC address), or it can be done such that each interface has its own address. The former requires that both ends of a link use the same aggregation method, but has performance advantages over the latter. One standard for performing link aggregation is specified in the Link Aggregation Control Protocol (LACP).

A Link Aggregation Group (LAG) is a group of links that have been aggregated together forming a group of links. A LAG is generally coupled to one or more switches of a switch fabric in a network. With regard to availability, a LAG allows a network adapter/link error to be confined to the network adapter/interface domain, where the "interface" is the abstraction of the group of links as a single link. With regard to scalability, the grouping of multiple physical links into one abstracted interface, e.g., a single Etherchannel representing a plurality of physical links, allows for aggregate latency and throughput performance improvements. In both cases, the user space applications are not participants in determining the interface or switch fabric behavior.

SUMMARY

In one illustrative embodiment, a method, in a device comprising a processor, for performing traffic load balancing on ingress traffic directed to a Link Aggregation Group (LAG). The method comprises monitoring, by the device, an ingress traffic load across a plurality of links of the Link Aggregation Group (LAG). The method further comprises determining, by the device, if the ingress traffic load across the plurality of links is unbalanced. Moreover, the method comprises, in response to determining that the ingress traffic load across the plurality of links is unbalanced, sending, by the device, a message to a switch associated with the LAG requesting the switch to modify routing of ingress traffic to the LAG to perform ingress traffic load balancing.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise link aggregation logic, monitoring logic, and traffic load balancing logic, each of which are configured to perform respective ones, or combinations of, the operations of the method described above. In some illustrative embodiments, the system/apparatus may comprise one or more processor and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
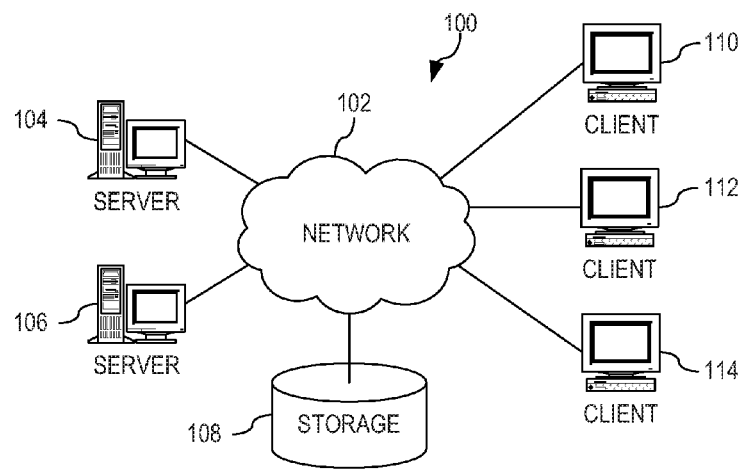
FIG. 1 is an example diagram of a distributed data processing system in which aspects of the illustrative embodiments may be implemented.

As mentioned above, one mechanism for increasing the reliability and throughput of network connections is to use link aggregation and aggregate a plurality of links into a Link Aggregation Group (LAG). A problem arises, however, under current aggregation models, in that the load distribution among the traffic flows (flow of data, data packets, frames, etc. from one element to another) and adapters in use is determined by tuples, e.g., a tuple of source address, source port, destination address, and destination port. The lack of sufficient entropy in the active tuple space is the key determinant to unbalanced distribution of traffic on ingress flows, i.e. from the switch to the LAG. Entropy, in this context, refers to a measure of randomness where a high port entropy allows distribution of connections uniformly across all available ports in a LAG without any skew. Because links are specified in terms of tuples, even when link aggregation is utilized, traffic of a particular link tends to go through a single port rather than multiple ports so as to avoid out-of-order packets, leading to a lack of sufficient entropy. The particular port to which the traffic is directed is determined before the traffic arrives at the network adapter of the host system and thus, is not able to be controlled by the host system. For example, a hashing algorithm may be utilized by the switches of the network to take fields of a packet and generate a hash index that points to a particular hash bucket identifying a corresponding port with which the connection is associated.

The egress distribution, i.e. from the LAG to the switch, is software controlled where software executing on the host system can ensure proper traffic distribution among the links of the LAG by performing load balancing operations. Thus, the ingress flow traffic balance is outside the control of the LAG mechanisms of the host even though egress traffic control is within the control of such LAG mechanisms. The switch to which the LAG is coupled is bound to the tuple constraints to ensure no out of order processing occurs on the LAG side. It would be beneficial to have a mechanism which allows the LAG to indicate to the switch how and when to perform rebalancing of the ingress flows such that optimal performance is obtained regardless of the particular traffic flows.

The illustrative embodiments provide mechanisms for autonomic traffic load balancing in link aggregation groups (LAGs). With the mechanisms of the illustrative embodiments, a LAG coordinates with an associated switch to negotiate graceful transition of ingress traffic flows among the members of the LAG. In some illustrative embodiments, the Link Aggregation Control Protocol (LACP) is extended to include extension fields to allow for passing information to the switch to indicate the options for ingress traffic rebalancing. With the mechanisms of the illustrative embodiments, the balancing of the ingress traffic is under the control of the LAG by providing extended fields in heartbeat messages that are constantly flowing between the switch and the LAG. These extended fields contain information about which links in the LAG are being overused. The extended fields may further contain information about which links in the LAG are links to which traffic that is otherwise mapped to the overused link should be redirected. The switch uses this information when routing traffic to reroute traffic from the overused link in the LAG to the desired link in the LAG. In this way, the ingress traffic is rebalanced under the control of the LAG of the host system.

The illustrative embodiments provide relief in situations where the network performance bottleneck is seen at an endpoint, i.e. source or destination computing device. The illustrative embodiments allow a system administrator to reduce network pressure by adding more adapters to the LAG, e.g., an Etherchannel. The load balancing of the illustrative embodiments is achieved without requiring measures of various metrics on the communication devices to assure port entropy. Furthermore, the illustrative embodiments do not suffer from out-of-order packet issues that plague round-robin load balancing methods.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
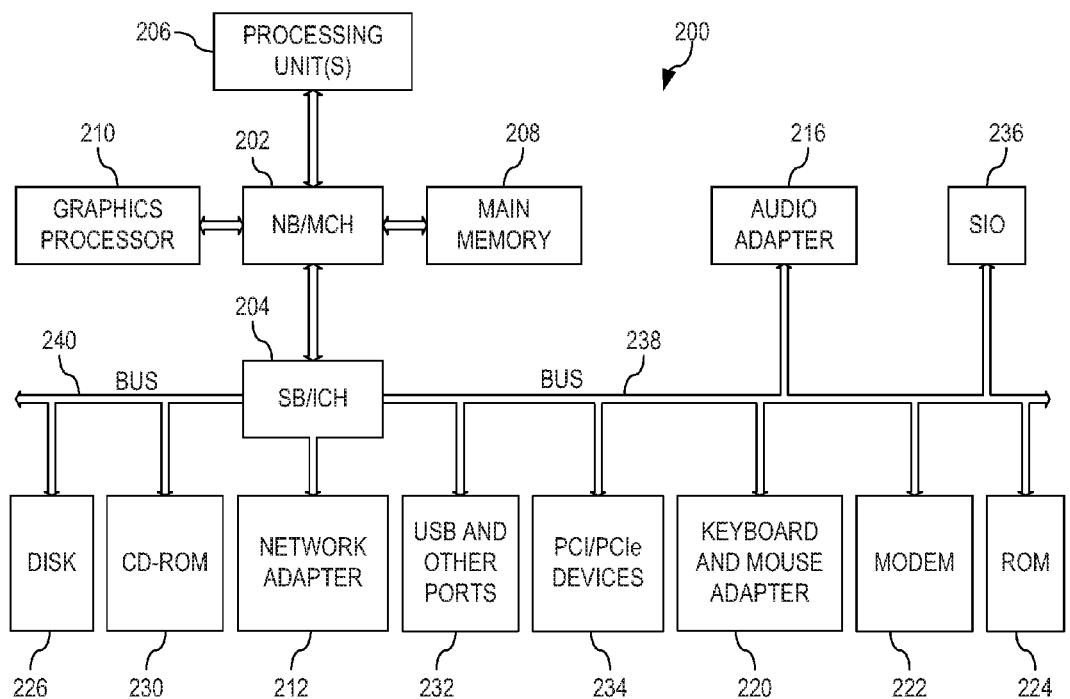
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with the illustrative embodiments, one or more of the computing devices in FIG. 1 may implement link aggregation mechanisms that implements Link Aggregation Groups (LAGs) and permits such LAGs to control ingress traffic by providing mechanisms for communicating between the LAGs and their associated switches to thereby inform the switches of the manner by which the LAGs wish the switches to rebalance traffic across the links of the LAG. For example, network adapters, such as network adapter 212 in FIG. 2, in one or more of the servers 104, 106 in FIG. 1 may implement logic and an extended Link Aggregation Control Protocol (LACP) that is extended to implement the features of the illustrative embodiments for performing ingress traffic load balancing with a LAG of the network adapter.

Figure 3:
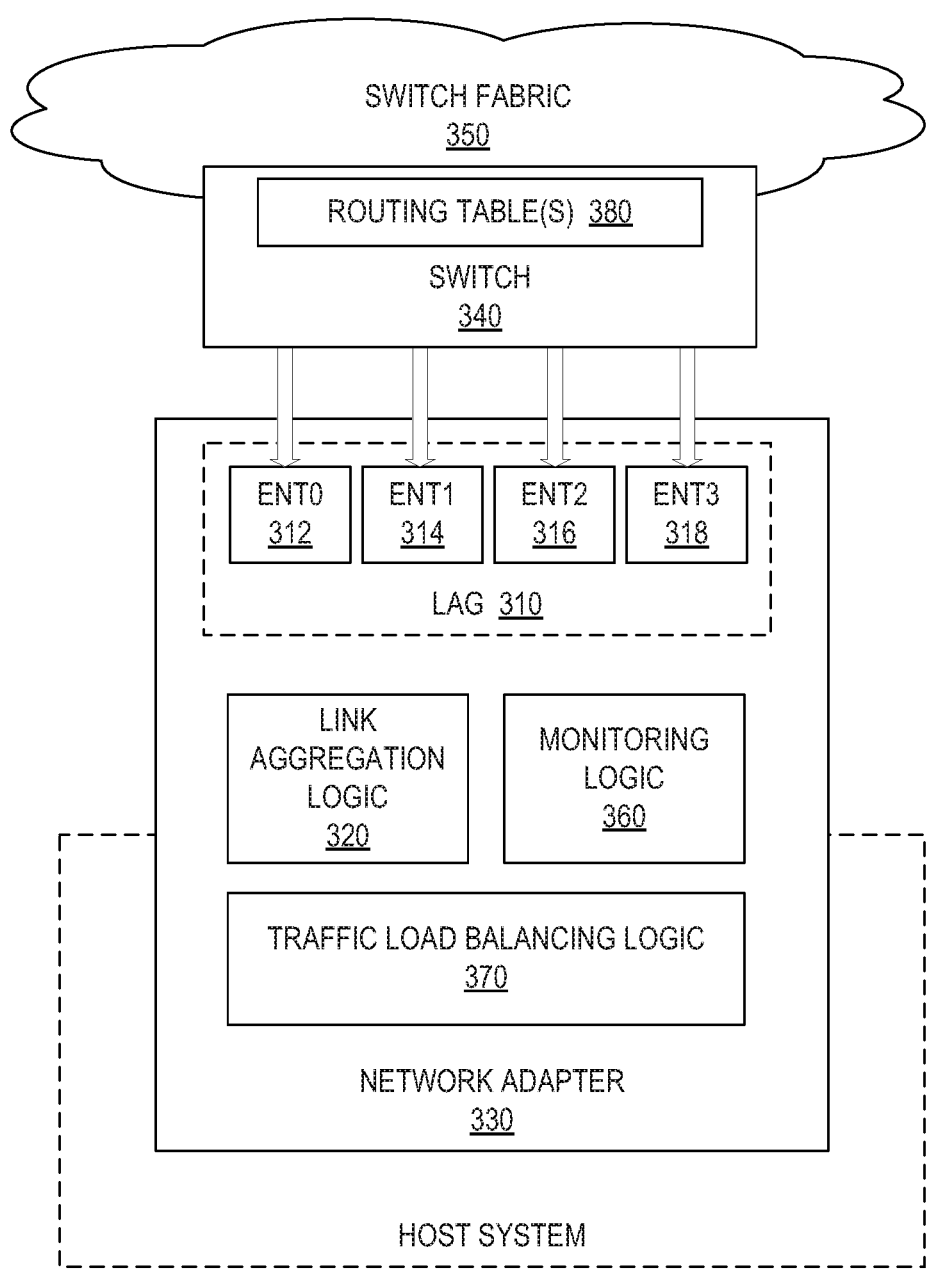
FIG. 3 is an example diagram of the link aggregation group during normal operation when traffic is balanced across the links.
Figure 4:
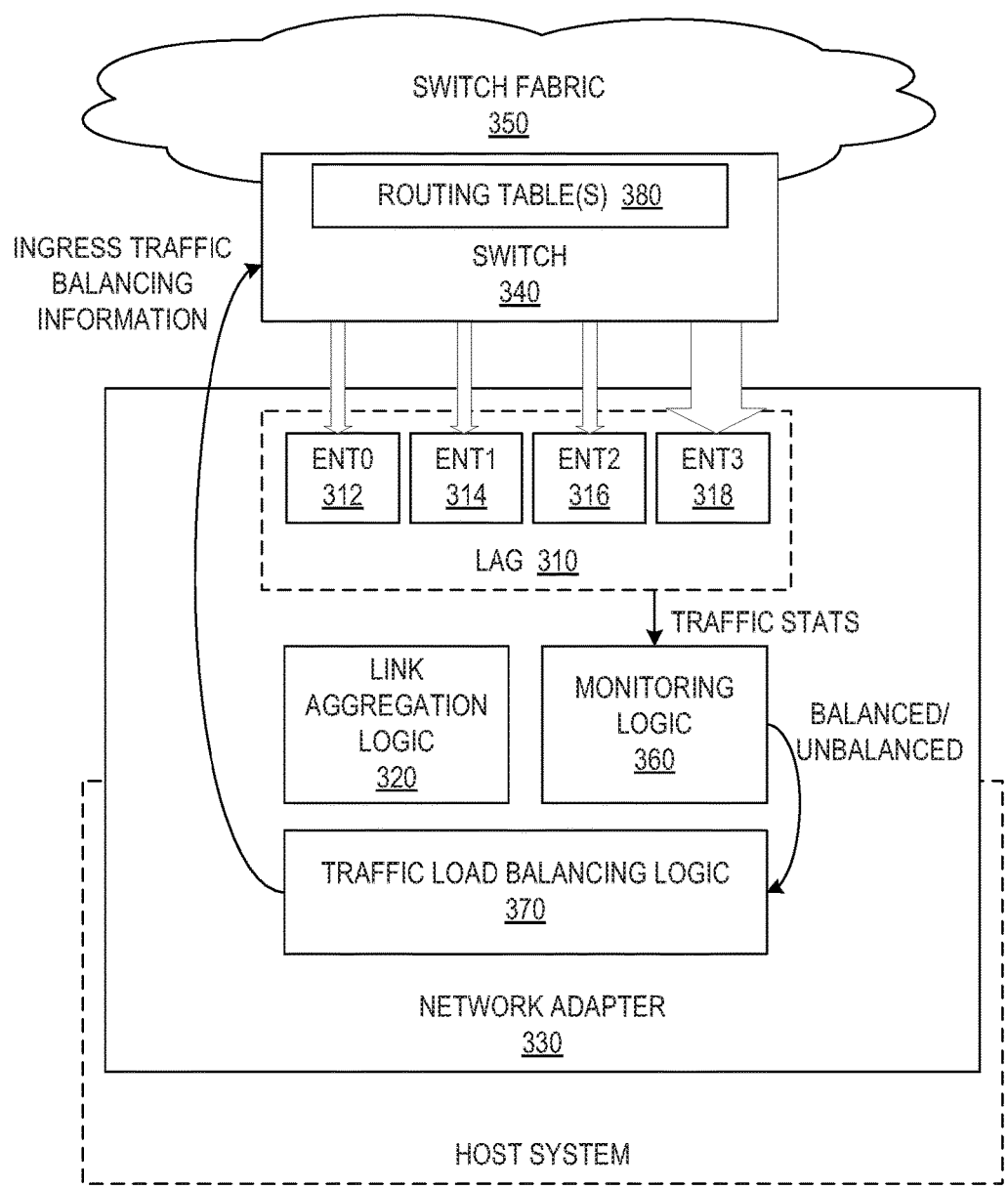
FIG. 4 illustrates a condition in which the traffic flowing from the switch to the Link Aggregation Group (LAG) becomes unbalanced.

FIGS. 3-4 are example diagrams illustrating issues with regard to unbalanced traffic in a link aggregation group. FIG. 3 is an example diagram of the link aggregation group during normal operation when traffic is balanced across the links, i.e. no spikes in traffic have occurred on any of the links of the link aggregation group. As shown in FIG. 3, the link aggregation group (LAG) 310, created using the link aggregation logic 320 (which may be implemented as software executed on hardware of the network adapter, firmware, hardware logic circuits, or any combination of the above) of the network adapter 330, comprises four links 312-318 that are aggregated into the LAG 310. The links 312-318 may be provided via physical of a network adapter that are coupled to the switch 340 of a switch fabric 350. It should be appreciated that the network adapter may utilize logical ports as well, but these logical ports must be coupled to the switch 340 via physical ports. Logical ports may be assigned to LAGs in a similar manner as physical ports without departing from the spirit and scope of the illustrative embodiments.

The links themselves may utilize any suitable communication protocol for the particular implementation. For purposes of the description of the illustrative embodiments, it will be assumed that the links are Ethernet links. However, it should be appreciated that this is only an example and is not intended to be limiting with regard to the types of links with which the illustrative embodiments operate. To the contrary, other types of links, such as Fiber Channel, Infini-Band, and the like, may be used without departing from the spirit and scope of the illustrative embodiments.

As mentioned above, the links 312-318 are combined into a LAG by link aggregation logic 320 of the network adapter 330. Link aggregation is generally known in the art and thus, a more detailed explanation of how link aggregation is accomplished is not provided herein. Any link aggregation model and logic may be used to perform the actual link aggregation and manage the link aggregation with the illustrative embodiments enhancing the management of the link aggregation by providing the additional functionality as described herein for balancing ingress traffic of a LAG.

For purposes of the description of the illustrative embodiments, it will be assumed that the LAG 310 is an EtherChannel comprising the plurality of Ethernet links 312-318. EtherChannel is a port link aggregation technology that allows grouping of several physical Ethernet links to create on logical Ethernet link for purposes of providing fault-tolerance and high-speed links between switches, routers, and servers. An EtherChannel can be created from between two and eight active Fast, Gigabit or 10-Gigabit Ethernet ports, with an additional one to eight inactive (failover) ports which become active as the other active ports fail. EtherChannel is primarily used in the backbone network, but can also be used to connect end user machines. While an EtherChannel is assumed for description purposes, this is not intended to be limiting and any type of LAG 310 may be used depending on the particular implementation desired.

As shown in FIG. 3, the traffic flowing from the switch 340 of the switch fabric 350 into the LAG 310, i.e. ingress traffic, is balanced under normal conditions. This is depicted in FIG. 3 as the arrow pointing from the switch 340 to the link ports (physical or logical) 312-318 being all of the same thickness. That is, no link 312-318 is being overly utilized and no other link 312-318 is being underutilized. In such a situation, load balancing of the ingress traffic is not needed and the mechanisms of the illustrative embodiments need not perform any rebalancing of the ingress traffic.

With reference now to FIG. 4, this figure illustrates a condition in which the traffic flowing from the switch 340 to the LAG 310 becomes unbalanced. This may occur, for example, when there is a burst or spike of traffic on one of the links 312-318 of the LAG 310. For example, in the depicted example, the traffic on link 318 experiences a spike which is depicted as a wider or thicker arrow flowing from the switch 340 to port 318 of the LAG 310. In accordance with the illustrative embodiments, monitoring logic 360 is provided in the network adapter 330 for monitoring the load on each of the links 312-318. For example, the monitoring logic 360 may generate statistics for each of the links 312-318 of the LAG 310 to determine a statistical measure of the amount of data flowing through each of the links 312-318 over a specified time quanta. These statistical measures may be further analyzed by the monitoring logic 360 to determine if the traffic of the LAG 310 is unbalanced. For example, comparisons of the statistical measures of each of the links 312-318 for the specified time quanta may be made to determine if one or more of the links 312-318 has a threshold amount or more of extra traffic than another link 312-318 in the LAG 310. Other types of analysis may be utilized as long as the analysis results in an indication of whether the ingress traffic of a LAG is balanced or unbalanced.

The monitoring logic 360 generates a result based on its analysis as to whether the ingress traffic of the LAG 310 is unbalanced or not and provides that result, as well as the statistical measure information for the links 312-318 to the traffic load balancing logic 370 of the network adapter 330. The traffic load balancing logic 370 determines the manner by which to balance the traffic load across the links 312-318 of the LAG 310. In so doing, the traffic load balancing logic 370 determines a desired LAG link and an exclude LAG link. The desired LAG link is a preferred physical link to which future traffic for the connection is to be transitioned, e.g., a link 312-316 that has a relatively lower statistical measure of traffic flow for the time quanta. The exclude LAG link is a physical link to exclude from the balancing group for this connection so that additional future traffic is not directed to this link, e.g., a link 318 having a relatively high statistical measure of traffic flow for the time quanta.

This information may be communicated back to the switch 340 so that the switch 340 may utilize this information when routing traffic to the LAG 310. That is, this information is communicated back to the switch 340 along with information specifically identifying the connection with which the information is associated. The switch 340 receives this information and updates its routing table(s) 380, e.g., its Content Addressable Memories (CAM), to route traffic, e.g., data packets, to the desired LAG link port and to no longer route traffic to the exclude LAG link port. Various ways of implementing this change in the routing may be utilized including extending the CAM table of the routing table(s) 380 to include a directive field for each entry that has a pointer to a directive database that indicates a directive for routing purposes. Other implementations may be to include an invalidate bit for link entries in the CAM table that invalidates the exclude LAG link and may have a different value for desired LAG links. Any implementation that permits the switch 340 to discern between a desired LAG link and an exclude LAG link in a LAG of a connection may be used without departing from the spirit and scope of the illustrative embodiments.

After updating its routing table(s) 380 data structures, the switch 340 may begin routing the ingress traffic destined for the LAG 310 using the updated routing table(s) 380. In this way, traffic is rebalanced by rerouting traffic from the overly utilized link 318 to one or more of the less utilized links 312-316. The network adapter 320 on the LAG 310 side of the communication is responsible for buffering and synchronizing data packets until the traffic begins to flow over the newly configured LAG links. Hence, the balance of the ingress traffic is returned to the state shown in FIG. 3.

In order to communicate the information from the LAG 310 side of the communication connection to the switch 340, e.g., from the traffic load balancing logic 370 of the network adapter 320 to the switch 340, a message is transmitted by the network adapter 320 to the switch 340. Such messages may be sent continuously, periodically, or in response to detected events, e.g., in response to an unbalanced traffic load of the LAG 310 being detected. In one illustrative embodiment, the message sent to the switch 340 is a Link Aggregation Control Protocol (LACP) message having the information in a LACP header associated with the LACP message. The LACP message may be a heartbeat message that is sent from the network adapter 320 to the switch 340 on a periodic basis to inform the switch 340 that the connections with the network adapter 320 are still live. The illustrative embodiments may utilize reserved fields of the LACP header that are not being utilized for communicating other information, as a mechanism for communicating the information regarding desired and excluded LAG links for specified connections to the switch 340. Thus, a separate message for this purpose is not required and the information may be communicated without requiring additional fields or large payloads in the LACP message.

Figure 5:
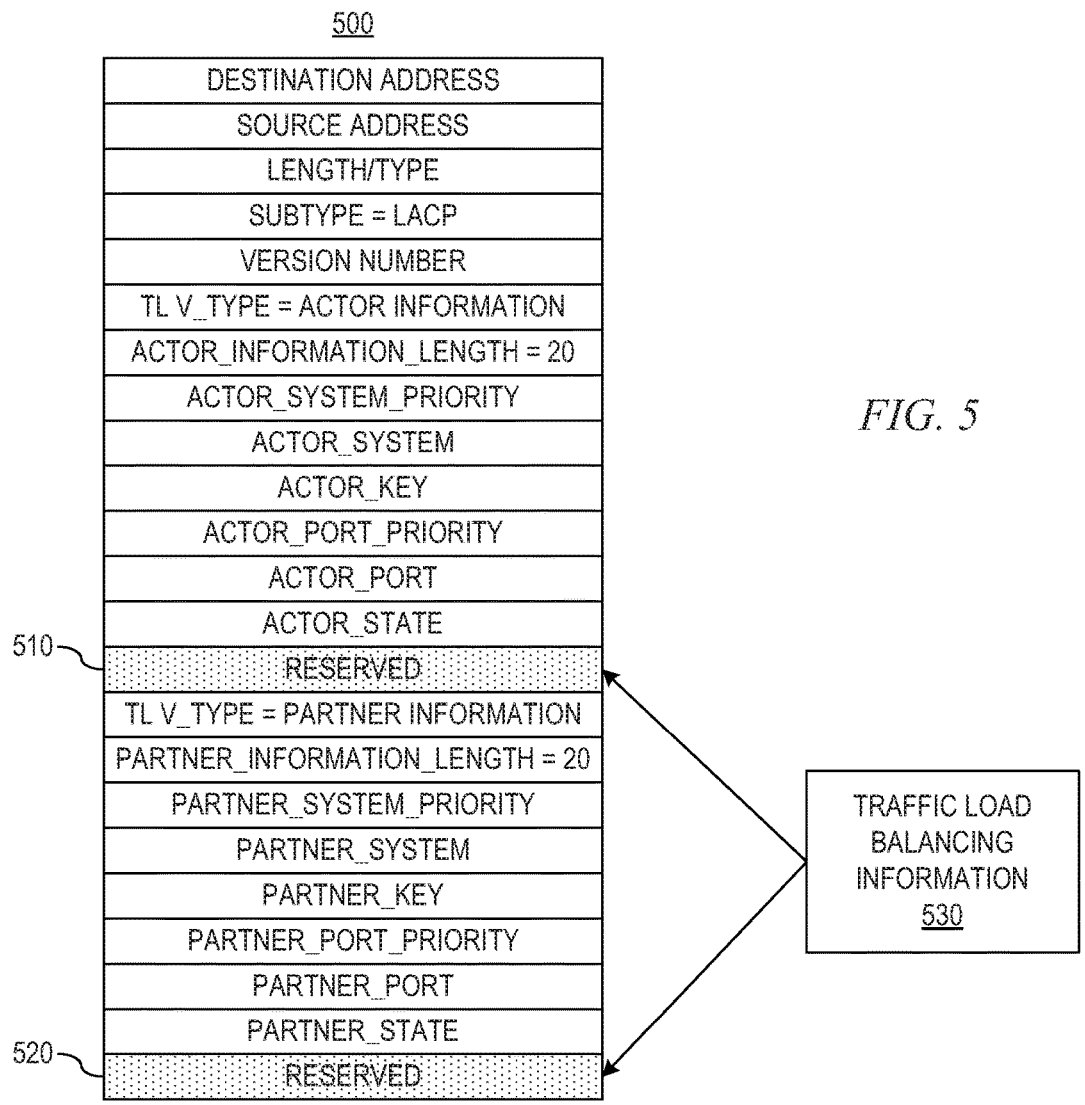
FIG. 5 is an example diagram of a Link Aggregation Control Protocol (LACP) header of an LACP message in accordance with one illustrative embodiment.

FIG. 5 is an example diagram of a LACP header of an LACP message in accordance with one illustrative embodiment. As shown in FIG. 5, the LACP header 500 comprises a plurality of fields, the majority of which are utilized for their standard purposes as specified in the LACP specification. As shown in FIG. 5, fields 510 and 520, in the LACP specification, are reserved fields for the actor (the entity initiating communication and performing actions), and the partner, respectively. These fields may be 3 bytes in size in the current LACP specification. However, in accordance with the illustrative embodiments, these fields 510 and 520 are repurposed to store the traffic load balancing information 530 that is communicated by the network adapter to the switch for purposes of performing ingress traffic load balancing for a LAG. For example, a tuple value and unique token value (described hereafter) may be placed in field 510 and a desired/exclude LAG link identifiers may be placed in field 520. Of course other distributions of this information between fields 510 and 520 may be used without departing from the spirit and scope of the illustrative embodiments.

For example, in one illustrative embodiment, on the LAG side of the communication connection, each ingress tuple representing a communication connection, e.g., source address, source port, destination address, and destination port, is identified by a unique token value. This token value may be provided to the switch via a LACP extension exchange such that the switch is informed of the correspondence between the tuple and the token and this information may be stored in a routing table data structure in the switch.

The LACP message that is transmitted from the network adapter to the switch contains the LACP header 500 with the ingress traffic load balancing information contained in one or more of the fields 510 and 520 of the LACP header 500. The ingress traffic load balancing information comprises the tuple value for the connection, i.e. the switch side value used to identify the connection (this tuple may be generated via a tuple hashing mechanism of the switch as is generally known in the art). The ingress traffic load balancing information further comprises the unique token that is generated on the LAG side to identify the connection, the desired LAG link identifier which is the preferred physical link to transition future traffic to as determined by the traffic load balancing logic of the network adapter, and an exclude LAG link identifier which is the physical link to exclude from the balancing group for the connection as determined by the traffic load balancing logic for the network adapter. It should be appreciated that the token is included in the illustrative embodiments since it is foreseeable that different directives may be used for the same tuple, however in other illustrative embodiments the tuple along may be used without the need for a token.

Thus, the LACP header 500 contains the ingress traffic load balancing information that is used to direct the switch to perform ingress traffic load balancing for the LAG and is communicated by the network adapter to the switch. Such control over ingress traffic for LAGs is not available in known load balancing mechanisms.

The LACP message containing the LACP header 500 may be a heartbeat message that is sent to the switch on a periodic basis to inform the switch that the network adapter is still alive and functioning properly. Alternatively, the LACP message may be a message that is sent in response to an event being detected, such as the detection of unbalanced ingress traffic for a LAG, for example. In accordance with the illustrative embodiments, the switch further comprises logic for consuming the received LACP message and using the token value, desired LAG link, and exclude LAG link as additional entropy variables when generating the result of the tuple hash of a data packet. That is, if a data packet is destined for the LAG and has a tuple hash that results in the exclude LAG link being the target of the routing, then the desired LAG link is used instead, at least until further notice from the network adapter.

The LACP message having the LACP header 500 is sent to the switch as a request which the switch is free to ignore if the switch does not support such functionality or if conditions exist that make it necessary to ignore the request. One or more of these LACP messages may be exchanged between the network adapter and the switch, such as one for each LAG supported by the network adapter. While a single LACP message at a time is described above as being used to reconfigure the routing of the switch with regard to ingress traffic, the illustrative embodiments are not limited to such. Rather, in some illustrative embodiments, the network adapter may generate a LACP frame with multiple LACP messages describing multiple connections. The switch may then batch process the messages when the LACP frame is received at the switch.

The determination of an unbalanced condition of ingress traffic of a LAG and subsequent messaging between the network adapter and the switch may be repeated over the lifetime of the LAG to switch association, thereby providing normalization of optimal performance traffic distribution. The mechanism of the illustrative embodiments avoid using an OSI layer 5 header as it introduces application level impacts resulting in proprietary protocols. Thus, the illustrative embodiments are independent of any mechanism which would break the standard OSI or application semantics.

Figure 6:
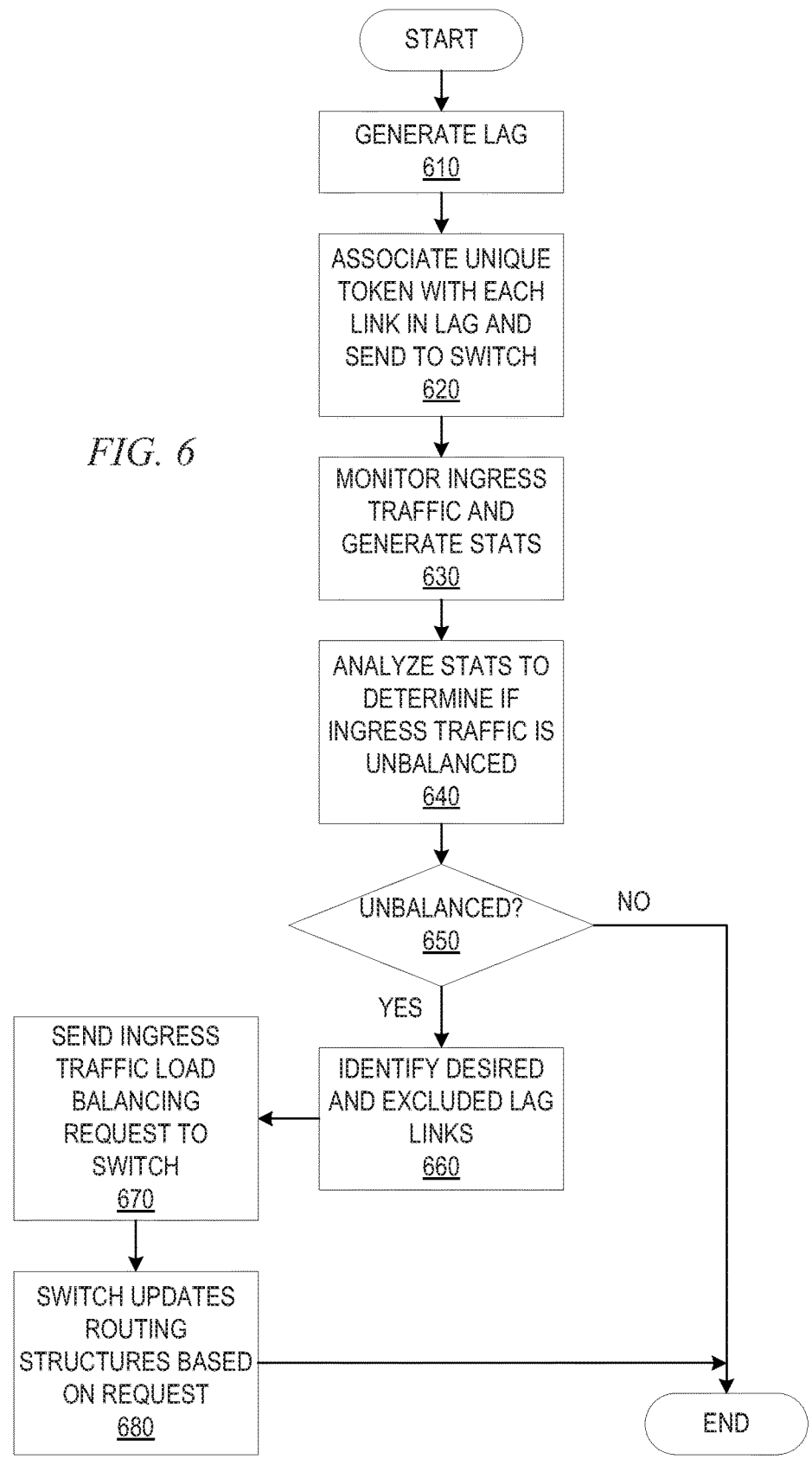
FIG. 6 is a flowchart outlining an example operation for performing ingress traffic balancing in accordance with one illustrative embodiment.

FIG. 6 is a flowchart outlining an example operation for performing ingress traffic balancing in accordance with one illustrative embodiment. As shown in FIG. 6, the operation starts with the establishment in a network adapter of a link aggregation group (LAG) comprising a plurality of links, each being identified by a tuple, e.g., source address, source port, destination address, and destination port (step 610). A unique token is associated with each of the links in the LAG and communicated to the switch with which the LAG is associated (step 620). The ingress traffic of the links of the LAG is monitored and statistical measures of the ingress traffic are generated (step 630). The statistical measures of the ingress traffic are analyzed to determine if the ingress traffic is unbalanced across the links of the LAG (step 640).

A determination is made as to whether the ingress traffic is unbalanced for the LAG (step 650). If not, the operation terminates. If so, then a desired LAG link and exclude LAG link are identified (step 660). An ingress traffic load balancing request is transmitted to the switch indicating the desired LAG link and exclude LAG link (step 670). The switch updates its routing data structures to cause data traffic targeting the exclude LAG link to be rerouted to the desired LAG link before transmission to the LAG (step 680). The operation then terminates.

It should be appreciated that while FIG. 6 illustrates the operation terminating, the operation may in fact be repeated on a continuous or periodic basis. Moreover, it should be appreciated that while FIG. 6 shows the message being transmitted in response to the determination that the ingress traffic is unbalanced, in other illustrative embodiments the messages are always transmitted, but when the ingress traffic is not unbalanced, the messages will not indicate any desired or exclude LAG links. Such an embodiment may utilize the heartbeat messages transmitted between the network adapter and switch to accomplish the messaging, for example.

Moreover, it should be appreciated that while the illustrative embodiments have been described with the traffic load balancing and monitoring logic being provided in the network adapter, in other illustrative embodiments, one or more of the logic elements may be provided in the host system associated with the network adapter. In this way, the host system may be involved in determining how to perform the traffic load balancing for a LAG rather than requiring the logic to be provided in the network adapter.

Thus, the illustrative embodiments provide mechanisms for allowing the LAG of a network adapter to control the routing of traffic to the LAG by the network adapter. In this way, ingress traffic may be load balanced when it would otherwise not be able to be controlled by the LAG.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:
    link aggregation logic;
    monitoring logic coupled to the link aggregation logic; and
    ingress traffic load balancing logic coupled to the monitoring logic, wherein:
    the link aggregation logic is configured to generate a Link Aggregation Group (LAG) comprising a plurality of links supported by the apparatus,
    the monitoring logic is configured to monitor an ingress traffic load across the plurality of links of a Link Aggregation Group (LAG), wherein the ingress traffic load represents an amount of ingress traffic transmitted from a switch associated with the LAG and external to the apparatus, to a host system associated with the LAG,
    the monitoring logic is configured to determine if the ingress traffic load across the plurality of links is unbalanced, and
    the ingress traffic load balancing logic is configured, in response to determining that the ingress traffic load across the plurality of links is unbalanced, to send a message to the switch associated with the LAG, requesting the switch to modify routing of ingress traffic to the LAG to perform ingress traffic load balancing.

2. The apparatus of claim 1, wherein the message is an extended Link Aggregation Control Protocol (LACP) message extended to include one or more fields for specifying parameters for the ingress traffic load balancing to the switch.

3. The apparatus of claim 2, wherein the parameters for the ingress traffic load balancing comprises a first parameter identifying a first link in the LAG, that is an overused link in the LAG, and a second parameter identifying a second link to which ingress traffic directed to the overused link should be redirected.

4. The apparatus of claim 3, wherein the switch, in response to receiving the extended LACP message, updates a routing table in the switch to redirect ingress traffic from the first link to the second link.

5. The apparatus of claim 2, wherein the extended LACP message is a heartbeat message sent from the device to the switch.

6. The apparatus of claim 2, wherein the one or more fields comprises a first field in a LACP header of the extended LACP message that is reserved for an actor, and a second field in the LACP header of the extended LACP message that is reserved for a partner.

7. The apparatus of claim 1, wherein the monitoring logic is further configured to monitor the ingress traffic load across a plurality of links of the LAG at least by:
    generating a statistical measure of an amount of data flowing through each link of the LAG over a specified time quanta; and
    comparing the statistical measures of each of the links in the LAG to each other link in the LAG to determine if one link has a statistical measure that is equal to or greater than a threshold amount greater than the statistical measure of the other links.

8. The apparatus of claim 1, wherein the switch, in response to receiving the message, updates a routing table of the switch to redirect ingress traffic directed to an overused link in the LAG to another link in the LAG.

9. The apparatus of claim 8, wherein the routing table of the switch is extended to include a directive field for each entry in the routing table, wherein the directive field stores a pointer to a directive database that indicates a directive for routing purposes, and wherein updating the routing table comprises updating a directive field of an entry in the routing table associated with the overused link to point to a directive in the directive database to route ingress traffic to the another link.

10. The apparatus of claim 1, wherein the apparatus is a network adapter of a host computing system, the network adapter comprises the link aggregation logic, monitoring logic, and ingress traffic load balancing logic, and wherein the ingress traffic load is an ingress traffic load for traffic flowing to the network adapter from the switch.

11. A computer program product comprising a non-transitory computer readable medium having a computer readable program stored therein, wherein the computer readable program, when executed on a computing device, causes the computing device to:

monitor an ingress traffic load across a plurality of links of a Link Aggregation Group (LAG), wherein the ingress traffic load represents an amount of ingress traffic transmitted from a switch associated with the LAG and external to the computing device, to a host system associated with the LAG;

determine if the ingress traffic load across the plurality of links is unbalanced; and in response to determining that the ingress traffic load across the plurality of links is unbalanced, send a message to the switch associated with the LAG, requesting the switch to modify routing of ingress traffic to the LAG to perform ingress traffic load balancing.

12. The computer program product of claim 11, wherein the message is an extended Link Aggregation Control Protocol (LACP) message extended to include one or more fields for specifying parameters for the ingress traffic load balancing to the switch.

13. The computer program product of claim 12, wherein the parameters for the ingress traffic load balancing comprises a first parameter identifying a first link in the LAG, that is an overused link in the LAG, and a second parameter identifying a second link to which ingress traffic directed to the overused link should be redirected.

14. The computer program product of claim 13, wherein the switch, in response to receiving the extended LACP message, updates a routing table in the switch to redirect ingress traffic from the first link to the second link.

15. The computer program product of claim 12, wherein the extended LACP message is a heartbeat message sent from the device to the switch.

16. The computer program product of claim 12, wherein the one or more fields comprises a first field in a LACP header of the extended LACP message that is reserved for an actor, and a second field in the LACP header of the extended LACP message that is reserved for a partner.

17. The computer program product of claim 11, wherein the computer readable program further causes the computing device to monitor the ingress traffic load across a plurality of links of the LAG at least by:

generating a statistical measure of an amount of data flowing through each link of the LAG over a specified time quanta; and comparing the statistical measures of each of the links in the LAG to each other link in the LAG to determine if one link has a statistical measure that is equal to or greater than a threshold amount greater than the statistical measure of the other links.

18. The computer program product of claim 11, wherein the switch, in response to receiving the message, updates a routing table of the switch to redirect ingress traffic directed to an overused link in the LAG to another link in the LAG.

19. The computer program product of claim 18, wherein the routing table of the switch is extended to include a directive field for each entry in the routing table, wherein the directive field stores a pointer to a directive database that indicates a directive for routing purposes, and wherein updating the routing table comprises updating a directive field of an entry in the routing table associated with the overused link to point to a directive in the directive database to route ingress traffic to the another link.

20. The computer program product of claim 11, wherein the computing device is a network adapter of a host computing system, the computer readable program is executed on the network adapter, and wherein the ingress traffic load is an ingress traffic load for traffic flowing to the network adapter from the switch.

* * * * *